(12) United States Patent
Owen et al.

(10) Patent No.: US 11,485,371 B2
(45) Date of Patent: Nov. 1, 2022

(54) METHOD OF ESTIMATING A VEHICLE LOAD

(71) Applicant: JAGUAR LAND ROVER LIMITED, Warwickshire (GB)

(72) Inventors: Thomas Owen, Coventry (GB); Roger Wardle, Coventry (GB); David Parry, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/277,358

(22) PCT Filed: Jul. 2, 2019

(86) PCT No.: PCT/EP2019/067688
§ 371 (c)(1),
(2) Date: Mar. 18, 2021

(87) PCT Pub. No.: WO2020/057789
PCT Pub. Date: Mar. 26, 2020

(65) Prior Publication Data
US 2021/0347369 A1   Nov. 11, 2021

(30) Foreign Application Priority Data
Sep. 18, 2018 (GB) .................................... 1815170

(51) Int. Cl.
*B60W 40/13* (2012.01)
*B60W 40/076* (2012.01)
(Continued)

(52) U.S. Cl.
CPC .......... *B60W 40/13* (2013.01); *B60W 40/076* (2013.01); *B60W 50/0097* (2013.01);
(Continued)

(58) Field of Classification Search
CPC ............... B60W 40/13; B60W 40/076; B60W 50/0097; B60W 2552/15; B60W 2510/02;
(Continued)

(56) References Cited

U.S. PATENT DOCUMENTS 4,789,936 A * 12/1988 Kurihara ............. F16H 61/0213
477/80
2008/0249693 A1   10/2008 Kresse
(Continued)

FOREIGN PATENT DOCUMENTS

DE    10 2005 008658 A1    8/2006
JP       2013221440 A      10/2013
(Continued)

OTHER PUBLICATIONS

Combined Search and Examination Report under Sections 17 and 18(3) for Application No. GB1815170.4 dated Feb. 1, 2019.
(Continued)

*Primary Examiner* — Edwin A Young
(74) *Attorney, Agent, or Firm* — Carlson, Gaskey & Olds, P.C.

(57) ABSTRACT

A method of estimating a load on a vehicle (10), the method comprising: obtaining a first load estimate using a first load estimation technique; obtaining a second load estimate using a second load estimation technique; analysing characteristics of the first load estimate and the second load estimate; and, based on the analysis selecting either the first load estimate or the second load estimate as an output load estimate.

19 Claims, 3 Drawing Sheets

(51) Int. Cl.
*B60W 50/00* (2006.01)
*F16H 59/52* (2006.01)
*F16H 59/66* (2006.01)

(52) U.S. Cl.
CPC ......... *F16H 59/52* (2013.01); *B60W 2510/02* (2013.01); *B60W 2510/1005* (2013.01); *B60W 2510/107* (2013.01); *B60W 2510/1055* (2013.01); *B60W 2510/18* (2013.01); *B60W 2520/06* (2013.01); *B60W 2520/10* (2013.01); *B60W 2520/105* (2013.01); *B60W 2520/125* (2013.01); *B60W 2530/00* (2013.01); *B60W 2530/10* (2013.01); *B60W 2552/15* (2020.02); *F16H 2059/663* (2013.01)

(58) Field of Classification Search
CPC . B60W 2510/1005; B60W 2510/1055; B60W 2510/107; B60W 2510/18; B60W 2520/06; B60W 2520/10; B60W 2520/105; B60W 2520/125; B60W 2530/00; B60W 2530/10; F16H 59/52; F16H 2059/663
See application file for complete search history.

(56) References Cited

U.S. PATENT DOCUMENTS

| | | | |
|---|---|---|---|
| 2014/0067153 A1* | 3/2014 | Yu | G06F 17/00 701/1 |
| 2015/0032373 A1* | 1/2015 | Ikari | G08G 1/123 73/146 |
| 2016/0082974 A1 | 3/2016 | Jeong et al. | |
| 2016/0114809 A1* | 4/2016 | Savaresi | G01G 19/086 702/41 |

FOREIGN PATENT DOCUMENTS

| | | |
|---|---|---|
| WO | 2007/098891 A1 | 9/2007 |
| WO | 2009/118624 A1 | 10/2009 |
| WO | 2015/004639 A2 | 1/2015 |

OTHER PUBLICATIONS

International Search Report and Written Opinion of the International Searching Authority for International application No. PCT/EP2019/067688 dated Jan. 3, 2020.

\* cited by examiner

METHOD OF ESTIMATING A VEHICLE LOAD

TECHNICAL FIELD

The present disclosure relates to a method of estimating a vehicle load and particularly, but not exclusively, to a method of controlling a vehicle based on an estimated vehicle load. Aspects of the invention relate to a method, to a controller, to a computer program product and to a vehicle.

BACKGROUND

All vehicles are subject to a force that acts in opposition to acceleration of the vehicle, which is known as the 'road load' or 'vehicle load'. The vehicle load is a product of the total vehicle mass, the gradient of the road on which the vehicle travels, and other factors such as headwinds and road surface type and condition.

Passengers, luggage, trailers, etc., can all add to the total vehicle mass, which may therefore be different for each journey that the vehicle makes.

Vehicle load has an impact on various aspects of vehicle control. For example, it may be desirable to adjust the control of an automatic transmission to account for varying vehicle load, since an increase in load entails a corresponding rise in the engine output required to provide a given vehicle acceleration, and also a rise in the stall speed of a torque converter of the transmission. It is therefore desirable to delay gear upshifts when ascending a hill, for example, to account for the increased work that the vehicle engine must perform to propel the vehicle while climbing due to the increase in vehicle load entailed by a positive road gradient.

In view of this, increasing vehicle load, for example as a result of a rising road gradient, is typically compensated for by controlling the transmission to adopt a more aggressive profile, so that gear shifts are implemented at higher engine speeds relative to when travelling on a level surface.

For example, the transmission may be controlled based on gear shift maps, which define the points at which gear changes are triggered in accordance with inputs including the vehicle speed and the accelerator pedal position. So, for example, the gear shift map may indicate that, for a particular gear ratio, the gear shift point is at a higher vehicle speed when the pedal is fully depressed than when the pedal is depressed to a lesser extent. This acknowledges that fully depressing the pedal typically indicates a driver demand for high acceleration.

The gear shift map is therefore a two-dimensional function, in that the shift points that it defines vary with respect to both vehicle speed and pedal position.

A set of gear shift maps may be used, each map being compensated for a particular discrete road gradient. For example, the set of maps may include a shift map for 2% gradient, 6% gradient, and so on. To provide effective control at gradients not precisely matching these discrete values, the pair of maps relating to gradients immediately above and below the estimated gradient are identified, and the gearshift points to implement based on the actual estimated gradient are determined using linear interpolation. For example, if the estimated gradient is 4%, the vehicle interpolates between the map for 2% gradient and the map for 6% gradient to produce a set of shift points corresponding to a 4% gradient.

In order to account for varying vehicle load, an effective road gradient may be calculated based on an estimated value of the vehicle load. The effective gradient is a gradient which would impart the estimated value of vehicle load on an otherwise unloaded vehicle. A shift map corresponding to the effective gradient may then be selected and a set of shift points may then be produced, as described above, using this effective road gradient. In this respect, the effective road gradient takes into account the actual road gradient, the mass of the vehicle and each of the other factors contributing to the vehicle load. The effective road gradient may be calculated using a function based on a predetermined relationship between vehicle load and effective road gradient.

Various techniques are known for estimating vehicle load, each with their respective strengths and weaknesses.

In a common approach, measurements of a load on a transmission output shaft and an output acceleration of that transmission shaft are obtained and cross-referenced with a calibrated model of vehicle road loads over a range of speeds on a horizontal surface.

Any deviation of the measurements from the calibrated model can be used to derive an estimate of the vehicle load, noting that an increasing vehicle road load reduces the acceleration output for a given transmission load. This approach is commonly referred to as a 'road load model' estimate. As described above, this estimate of the vehicle load is then used to determine an effective road gradient which in turn is used to determine a set of shift points for the transmission.

As an alternative to taking measurements from the transmission shaft, wheel speed measurements could be obtained so that actual vehicle acceleration can be compared with a predicted vehicle acceleration. Other sources of acceleration data are also possible; in each case, the road load model applies the same principle of comparing predicted acceleration with actual acceleration to detect deviations in vehicle load relative to its base load.

It is noted that the road load model estimate cannot distinguish between the different factors that contribute towards vehicle load. For example, adding weight to the vehicle, a positive road gradient and a headwind will all elevate the transmission load required to deliver a given acceleration, but the estimation model is unable to distinguish between these causes of increased load.

Factors that may cause inaccuracy in the estimated vehicle load provided by the road load model include: pressing the vehicle brakes, which artificially increases the load; a loss of traction of one or more road wheels, which gives the appearance of decreased load; a gear shift being in progress, which temporarily releases the load from the transmission shaft; the vehicle transitioning from a state of acceleration to one of deceleration; and the vehicle speed being below a calibrated threshold that relates to physical limitations of sensors used to measure the transmission shaft speed or wheel speed.

In another approach, the vehicle load estimate may be based on the longitudinal acceleration of the vehicle as indicated by an on-board accelerometer. Such accelerometers are able to detect a gravitational component of acceleration when the vehicle is on a gradient, which can be used to estimate the actual road gradient. The estimated actual road gradient can in turn be combined with an estimated vehicle mass to produce an estimation of the vehicle load. As described above, this estimate of the vehicle load is then used to determine an effective road gradient which in turn is used to determine a set of shift points for the transmission.

The accelerometer-based approach is particularly accurate when the vehicle is stationary, as the signal noise is low; although the technique can be used at all times.

While the vehicle is stationary, the accelerometer will indicate a longitudinal acceleration of zero m/s² if the vehicle is on a perfectly horizontal road. However, if the actual road gradient is non-zero, the indicated longitudinal acceleration will also be non-zero due to a gravitational component of acceleration acting on the accelerometer. Therefore, hypothetically, if the vehicle were on a 90° incline the accelerometer would indicate longitudinal acceleration of 1g, where 'g' represents acceleration due to gravity on earth, which is approximately equal to 9.8 m/s².

If attempting to estimate the actual road gradient in this way while the vehicle is moving, the longitudinal acceleration indicated by the accelerometer can be compared with vehicle acceleration as indicated by wheel speed data to resolve the gravitational component of acceleration accurately from the overall detected acceleration.

As already noted, the actual gradient estimate can be combined with an estimate of the total vehicle mass to generate a vehicle load estimate. The mass estimate may need to be accurate to within 100 kg, for example, to provide an acceptably accurate vehicle load estimate.

In this respect, it is noted that the vehicle may include optional extras that add additional bulk on top of the vehicle base mass, knowledge of which is not necessarily held by the vehicle in advance. In addition, as already noted the total vehicle mass may be different for each journey that the vehicle makes due to additional mass in the form of luggage, trailers, etc.

The vehicle must therefore estimate its overall mass for each journey that it undertakes. This is typically achieved through analysing vehicle dynamics over time, noting that the total mass is equal to the resultant force acting on the vehicle divided by the vehicle acceleration. It can take a significant period to refine the estimate to a reasonable level of accuracy, until which point the accelerometer-based actual gradient estimate cannot be converted into an accurate vehicle load estimate.

Although the actual gradient estimate based on measurements produced by the accelerometer is relatively reliable, the mass estimate that is required to convert it into a vehicle load estimate is susceptible to error in a similar way to the road load model. Various factors including those mentioned above can distort a mass estimate. Additionally, a headwind, insofar as it resists movement of the vehicle in a similar way to additional mass, may cause the vehicle to overestimate the total mass.

It is also known, for example from US 2014/0067153, to use more than one technique in parallel to provide multiple road gradient estimates. The final road gradient estimate is then selected from the set of estimates available based on indications of the vehicle state, so that each technique is used during specific vehicle operating conditions. However, this approach is relatively inflexible and cannot dynamically respond to changes in estimate reliability caused by factors such as activation of the brakes or traction control system, or gear shift events, for example.

It is against this background that the present invention has been devised.

SUMMARY OF THE INVENTION

According to an aspect of the present invention there is provided a method of estimating a load on a vehicle. The method comprises: obtaining a first load estimate using a first load estimation technique; obtaining a second load estimate using a second load estimation technique; analysing characteristics of the first load estimate and the second load estimate; and, based on the analysis selecting either the first load estimate or the second load estimate as an output load estimate.

By arbitrating between multiple load estimates, beneficially the method increases the likelihood that an accurate estimate of load is available in all driving situations, since each load estimate may be generated using different techniques and so are not subject to the same vulnerabilities. This in turn enhances adjustment of vehicle operation based on the load estimate, for example updating gear shift maps.

Analysing characteristics of the first load estimate and the second load estimate optionally comprises comparing corresponding characteristics of the first and second load estimates.

The method may comprise determining, for each of the first and second load estimates, a respective estimated gradient of a surface on which the vehicle is located. In such embodiments, analysing characteristics of the first load estimate and the second load estimate comprises analysing corresponding characteristics of the respective estimated gradients associated with the first and second load estimates, for example comparing the estimated gradients associated with the first load estimate and/or the second load estimate with one or more threshold values. Such methods may further comprise selecting the second load estimate as the output load estimate if the estimated gradient associated with the second load estimate is below a first threshold value of the one or more threshold values and the estimated gradient associated with the first load estimate is positive. The first threshold value may be positive, for example. Such methods may also comprise selecting whichever of the first load estimate and the second load estimate has the highest value as the output vehicle load estimate if the estimated gradients associated with the first and second load estimates are both positive and the estimated gradient associated with the second load estimate exceeds the first threshold.

In embodiments that involve determining respective gradients for the first and second load estimates, the method may comprise selecting the second load estimate as the output load estimate if the estimated gradient associated with the second load estimate is above a second threshold value of the one or more threshold values and the estimated gradient associated with the first load estimate is negative. The second threshold value is optionally negative. Such methods may also comprise selecting whichever of the first load estimate and the second load estimate has the lowest value as the output vehicle load estimate if the estimated gradients associated with the first and second load estimates are both negative and the estimated gradient associated with the second load estimate is below the second threshold.

In some embodiments, the method comprises receiving one or more signals indicative of vehicle operating parameters, and inhibiting the first load estimation technique and/or the second estimation technique in dependence on the or each signal indicative of vehicle operating parameters. Such embodiments may also comprise inhibiting the first load estimation technique and/or the second estimation technique in dependence on the quality of at least one of the signals indicative of vehicle operating parameters. The vehicle operating parameters may comprise at least one of the following: a braking state; a transmission state; a gear selector state; lateral acceleration of the vehicle; operating mode; vehicle speed; longitudinal acceleration; gearbox oil temperature; a traction control system state; a rate of change of drive shaft torque; a rate of change of a gradient of a surface on which the vehicle is travelling; a torque converter state; and a torque direction.

The first load estimation technique may comprise receiving a signal indicative of an acceleration of the vehicle, and comparing the indicated acceleration with a predicted acceleration to determine the first load estimate.

The second load estimation technique optionally comprises receiving a signal indicative of a longitudinal acceleration of the vehicle and resolving a component of the longitudinal acceleration that is due to gravity. Such methods may further comprise estimating a gradient of a surface on which the vehicle is located in dependence on the magnitude of the component of longitudinal acceleration that is due to gravity, in which case the method may also comprise estimating a mass of the vehicle and determining the second load estimate in dependence on the estimated vehicle mass and the estimated surface gradient.

The invention also extends to a method of operating a vehicle, comprising estimating a load on the vehicle using the method of the above aspect, and controlling an automatic transmission of the vehicle in dependence on the output load estimate. The method may also comprise adjusting a gear shift map that is used to control the transmission in dependence on the estimated vehicle load.

Other aspects of the invention provide a controller configured to implement the method of either of the above aspects, a computer program product comprising computer readable code for controlling a computing device to perform the method of either of the above aspects, and a non-transitory computer readable medium comprising such a computer program product.

A further aspect of the invention provides a controller configured to control an automatic transmission of a vehicle. The controller comprises a processor configured to: obtain a first load estimate using a first load estimation technique; obtain a second load estimate using a second load estimation technique; analyse characteristics of the first load estimate and the second load estimate; and, based on the analysis select either the first load estimate or the second load estimate as an output load estimate; and an output configured to issue control commands for controlling the transmission based on the output load estimate.

The processor may comprise an electronic processor having an electrical input for receiving one or more signals indicative of values used to compute the first and second load estimates, or to receive indications of the first and second load estimates directly, and an electronic memory device electrically coupled to the electronic processor and having instructions stored therein. The processor may be configured to access the memory device and execute the instructions stored therein such that it is operable to produce a final load estimate.

The invention also extends to a vehicle comprising the controller of either of the above aspects.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which like features are assigned like reference numerals, and in which.

DETAILED DESCRIPTION

In general terms, embodiments of the invention provide a vehicle load estimate with enhanced confidence compared with prior art approaches. Improving the accuracy of the vehicle load estimate in turn enables optimised control of vehicle systems that are influenced by the vehicle load estimate, such as an automatic transmission as discussed above.

The enhanced accuracy in the vehicle load estimate is achieved by using at least two load estimation techniques continuously in parallel, to provide respective real-time vehicle load estimates, and dynamically arbitrating between the vehicle load estimates to determine and select the most reliable estimate at all times.

Unlike prior art approaches, which arbitrate between multiple estimates purely based on external factors that are indicative of the vehicle state, in embodiments of the invention characteristics of the individual estimates are analysed to assess which estimate is the most reliable. In particular, corresponding characteristics of the estimates may be compared as part of this assessment. This provides a more dynamic and flexible approach than that of the prior art, which enables the arbitration to respond to a wider range of variables and ultimately improves the average accuracy of the final estimate.

For example, where two or more apparently valid vehicle load estimates are available, the highest vehicle load estimate value may be selected so that the vehicle can be controlled for the worst case scenario.

The means by which two specific individual vehicle load estimates may be obtained in embodiments of the invention shall now be described, before moving on to consider the process by which the more reliable of those two estimates is determined.

It is noted that the two vehicle load estimation techniques described below are used for illustrative purposes only, and embodiments of the invention can arbitrate between estimates obtained using other techniques.

Moreover, the inventive concept is not limited to arbitrating between two vehicle load estimates, and indeed any number of individual estimates may be compared and selected between to provide a final vehicle load estimate that is used for controlling vehicle systems.

Figure 1:
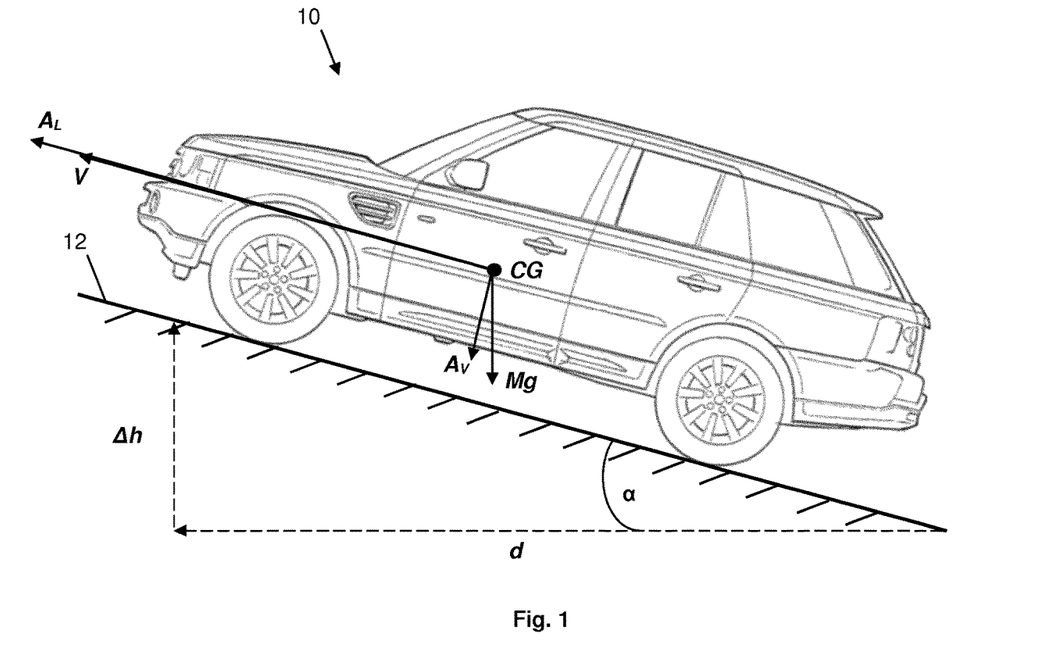
FIG. 1 is a schematic side view of a vehicle travelling up an incline.

Turning now to FIG. 1, a vehicle 10 is shown travelling with velocity V on a road 12 that is upwardly-inclined. Due to the inclination of the road 12, moving a certain distance longitudinally along the road 12—from right to left as viewed in FIG. 1—produces a corresponding rise in the road level. The longitudinal movement is commonly referred to as the 'run', which is represented as 'd' in FIG. 1, whereas the increase in height is referred to as the 'rise', which is represented as '$\Delta h$' in the figure.

The particular run and rise ratio shown in FIG. 1 produces a longitudinal gradient that is indicated by angle '$\alpha$', which in that example is 15°. This may alternatively be expressed as just under 1 in 4, meaning that the road 12 exhibits one unit of rise for every 4 units of run. This may be higher than a vehicle would typically be expected to tackle, as road gradients are often limited to around 12°.

The centre of mass of the vehicle 10 is represented in FIG. 1 by the point marked 'CG'. The weight of the vehicle 10, namely the force acting on the vehicle 10 due to gravity, acts vertically through the centre of mass and is represented by the arrow marked 'Mg', since the weight is equal to the product of the vehicle mass M and gravitational acceleration g.

The velocity V of the vehicle 10, which has a direction that is parallel to the road surface, is increasing. This means that the vehicle 10 accelerates both longitudinally, which is represented by the arrow marked '$A_L$', and vertically, which is represented by the arrow marked '$A_V$' that is oriented orthogonally to the longitudinal acceleration.

It is noted that for simplicity the effect of vehicle pitch has been ignored in FIG. 1, so that the longitudinal acceleration of the vehicle 10 is aligned with the velocity.

FIG. 1 therefore shows three components of acceleration that can be detected by an on-board accelerometer (shown in FIG. 2) to derive an estimate of the road gradient, which in turn impacts the vehicle load as noted above. It is noted that if the vehicle 10 deviates from a straight path lateral acceleration will arise, namely a centripetal acceleration directed towards the centre of a turning circle that the vehicle 10 traverses.

Figure 2:
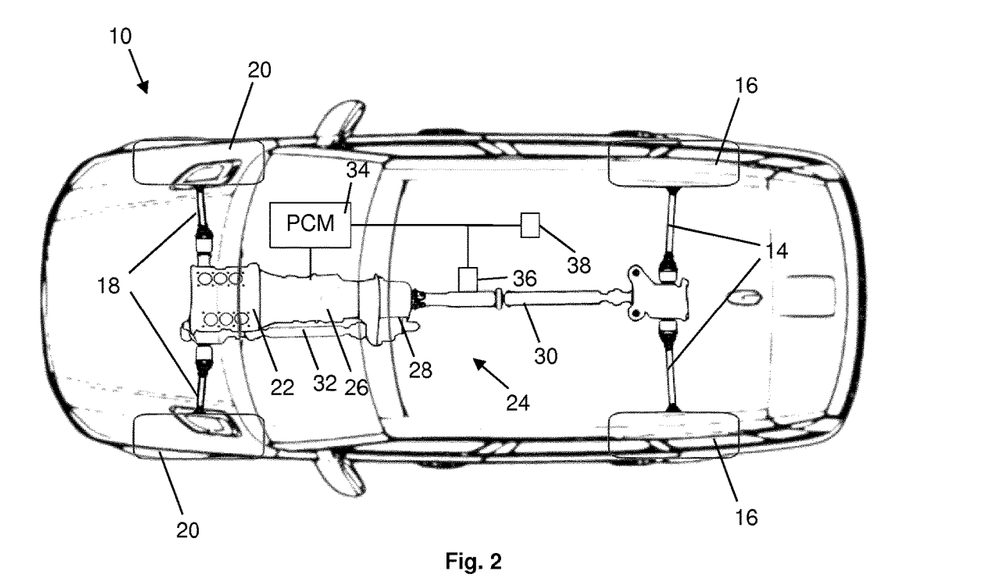
FIG. 2 is a schematic top view of the vehicle of FIG. 1.

FIG. 2 shows the vehicle 10 from above with some internal components revealed. As is apparent from FIG. 2, the vehicle 10 adopts a split-axle layout of a kind that will be familiar to the skilled person, in which a pair of mutually-opposed rear axles 14 support respective coaxial rear road wheels 16, and a pair of mutually-opposed front axles 18 support respective coaxial front road wheels 20.

The vehicle 10 includes an internal combustion engine 22 that is disposed on a central longitudinal axis of the vehicle 10 between the front road wheels 20. In this example, the engine 22 drives all four road wheels 16, 20, so that the vehicle 10 is a 'four-wheel drive' vehicle.

FIG. 2 also shows a vehicle drivetrain 24 that is configured to transmit torque from the engine 22 to the road wheels 16, 20. The drivetrain 24 includes an automatic transmission 26 that extends longitudinally between the engine 22 and a transfer case 28, to transfer torque output by the engine 22 to the transfer case 28. In turn, the transfer case 28 is configured to divide the torque for delivery to both a rear driveshaft 30 and a front driveshaft 32.

The rear driveshaft 30 extends longitudinally and coaxially with the transmission 26 to couple to and transmit torque to the rear axles 14 and thus drive the rear road wheels 16. The front driveshaft 32 extends in the opposite direction to the rear driveshaft 30 and in parallel to the transmission 26, to couple to the front axles 18 beneath the engine 22 and thereby transmit torque to the front axles 18 to drive the front road wheels 20.

The automatic transmission 26 may be of any suitable type, for example a hydraulic automatic transmission. The internal components of the automatic transmission 26 are not shown in FIG. 2 to avoid obscuring the invention with unnecessary detail, but the skilled person will appreciate that such transmissions typically include a set of epicyclic gearsets to provide the required gearing ratios, and a torque converter to couple the engine 22 output to the epicyclic gearsets.

The automatic transmission 26 is controlled by a powertrain control module (PCM) 34, which combines the functions of an engine control unit (ECU) and a transmission control unit (TCU). In other embodiments, a separate ECU and TCU may be used instead.

The PCM 34 is responsible for controlling operation of both the engine 22 and the automatic transmission 26. In this respect, the PCM 34 receives input data from a suite of on-board sensors and generates control signals that are transmitted to the engine 22 or to the automatic transmission 26 as appropriate. The skilled reader will appreciate that the PCM 34 includes one or more processors that are configured to analyse the input data to generate the control signals.

The input data may include indications of, for example, the currently-selected gear, engine speed, engine load, road wheel speed, exhaust gas flow rate, engine intake pressure, vehicle operating mode, accelerator pedal position, ambient temperature and many more. The skilled reader will appreciate that obtaining such data from standard on-board sensors is entirely conventional and common to most modern vehicles, and so this will not be described in more detail here.

The control signals issued to the automatic transmission 26 by the PCM 34 typically consist of either a command to upshift, namely to select a higher gear ratio than that at which the transmission 26 is currently operating, or a command to downshift, namely to select a lower gear ratio than is currently in use. Typically, upshift or downshift commands effect an incremental increase in gear ratio to adopt an adjacent gear ratio, but it is possible for a command to effect an upshift or a downshift that skips the adjacent gear ratio in some conditions.

As already noted, gear shifts are implemented in accordance with a selected gear shift map, which defines the points at which an upshift or a downshift is triggered based on vehicle operating parameters, in particular the vehicle speed and the position of the accelerator pedal. The PCM 34 selects from a set of gear shift maps according to instantaneous operating conditions and in particular the present estimated vehicle load and vehicle operating mode. For example, if the automatic transmission 26 is set to a 'sport' operating mode, the PCM 34 selects a corresponding gear shift map—which would typically exhibit relatively aggressive gear change behaviour in which gear changes are triggered at relatively high vehicle speeds—and controls the transmission 26 accordingly.

It is noted at this stage that a gear shift map may take various forms, including an array or matrix of values such as look-up table, or a mathematical function.

It is also noted that the term 'gear shift map' does not necessarily entail an overall and complete representation of every shift point for any operating condition and any selected gear; although the term does encompass this. Instead, a gear shift map may include only a sub-set of the values representing every scenario, and in particular may only indicate gear shift points for a currently-selected gear.

The PCM 34 is also responsible for estimating the vehicle load in this example. In this respect, as already noted, the PCM 34 uses two different vehicle load estimation models to generate respective vehicle load estimates, and then arbitrates between those estimates by comparing them with each other and/or against calibrated thresholds, to select the estimate that is taken forward as a final vehicle load estimate. The final vehicle load estimate is then used to determine, for example, an appropriate gear shift map on which to base control of the transmission 26.

The PCM 34 may include a processor configured to run all of the vehicle load estimation models, or a set of processors forming a processing module to fulfil this task.

In this example, the two vehicle load estimation models that are used are the 'road load model' and the accelerometer-based estimation model that have already been described and which will be familiar to the skilled person.

Accordingly, a sensing device 36 is attached to the rear driveshaft 32 to provide a signal that is indicative of the transmission load.

As it is impractical and excessively costly to implement torque sensing devices in production vehicles, computer models are instead used to provide signals indicative of the transmission output torque, or acceleration. In this respect, as is conventional an engine management system of the PCM 34 outputs a crankshaft torque, which can be converted into a transmission shaft with reference to known shaft ratios. These signals are transmitted to the PCM 34 by any suitable means, for example using a conventional vehicle CAN bus.

The PCM 34 includes a readable memory that holds a copy of a calibrated model of vehicle road loads over a range of steady speeds on a horizontal surface. The PCM 34 compares the measurements of transmission torque and load with the calibrated model, and uses any deviation of the measurements from the calibrated model to derive a first vehicle load estimate.

The vehicle 10 also includes an inertial sensor in the form of an accelerometer 38 that is able to detect and output a signal indicative of longitudinal acceleration, namely acceleration in a direction parallel to the surface of the road 12 on which the vehicle 10 stands. The signal indicative of longitudinal acceleration is transmitted to the PCM 34 using suitable means such as a CAN bus.

As already described, when the vehicle 10 is on a level surface the accelerometer 38 will only detect the longitudinal acceleration $A_L$ of the vehicle 10. However, if the vehicle 10 is on an incline, as in FIG. 1, the accelerometer 38 will detect a combination of the longitudinal acceleration $A_L$ of the vehicle 10 and the acceleration due to gravity, g. If the velocity V is zero, the accelerometer 38 only detects acceleration due to gravity, which can be converted directly into an estimated road gradient.

If the velocity V is non-zero, the indicated longitudinal acceleration is compared with the velocity V as indicated by wheel speed sensors, for example, to determine the magnitude of $A_L$ and thereby resolve the gravitational component of acceleration from the indicated longitudinal acceleration and produce a road gradient estimate.

The PCM 34 then uses an estimate of the vehicle mass to convert the gradient estimation into a second vehicle load estimate.

To estimate the vehicle mass, the PCM 34 includes an algorithm that monitors vehicle dynamics over time. For example, the acceleration of the vehicle 10 as indicated by the accelerometer 38 may be compared with the transmission torque to provide an indication of the vehicle mass. The algorithm also uses the estimated road gradient based on the accelerometer readings to refine the mass estimation, noting that the road gradient has an impact on vehicle acceleration.

As already mentioned, the mass estimation algorithm must iterate each time the vehicle 10 embarks on a new journey, since the vehicle mass may be different to the previous journey as a result of adding passengers or a trailer, for example.

The mass estimation algorithm iterates continuously from an initial estimate that is likely to be inaccurate, so that the vehicle mass estimate output by the algorithm is continuously refined and therefore increasingly accurate. As noted earlier, a calibrated period is defined for the algorithm to produce a mass estimate of sufficient accuracy. This period may be defined in terms of a discrete number of iterations of the mass estimate algorithm, or as a time period. Until the period elapses an accurate second vehicle load estimate based on the accelerometer readings cannot be generated, although a calibrated value for the vehicle mass may be used instead to enable the second vehicle load estimate to be generated with reasonable accuracy.

Even after the period has elapsed, the mass estimation algorithm continues to iterate to refine the mass estimate further.

The specific methods for estimating the mass of a vehicle are well-known and not the subject of this application, and so shall not be considered further.

In certain operating conditions, the first vehicle load estimate, which is based on the road load model, may be incorrect due to interaction between the data used by the estimation model and instantaneous vehicle operating conditions. At such times, the first vehicle load estimate is 'inhibited', meaning that the estimate is flagged as unreliable and therefore not used as the final vehicle load estimate; the second road vehicle load estimate is used instead at such times, if available.

A non-exhaustive list of the factors that may cause the first vehicle load estimate to be inhibited is set out below:

- the vehicle brake is pressed, in which case no reliable value for torque is available for the road load model;
- the vehicle speed—for example as indicated by a speed of an engine output shaft is below a threshold, since speed sensor data becomes unreliable at low speeds, and also this condition generally corresponds to open torque converter conditions which may not include data points in the calibrated model of road load;
- the torque direction is transitioning from driving torque to overrun torque, for example when the accelerator pedal is released—the lash crossing produces unreliable output torque;
- a gear shift is in progress, during which no reliable value for torque is available to drive the road load model;
- the lateral acceleration is above a threshold, which typically indicates that the vehicle 10 is cornering, in which case the torque value may be unreliable due to tyre slip and the road load model is inhibited in case the vehicle 10 is traversing a relatively flat switchback on a steep alpine road, for example, to prevent the triggering of an upshift during cornering due to the temporary change in road gradient;
- reverse gear is selected, as the road load model is not calibrated for reversing since vehicles typically only include one reverse gear and so gear shifting is not applicable;
- a vehicle traction control system is active, since such systems interfere with the torque applied to the transmission 26, which is therefore no longer a reliable indication of road load;
- the gear selector position or shift mode is changing or has recently changed, as the system requires a short period to settle after such changes;
- the gearbox oil temperature is below a threshold, as the transmission torque loss may be elevated until the oil reaches its operational temperature, before which the oil viscosity is high and frictional losses increase.

Each of the above inhibit conditions has an associated timer that dictates how long the first vehicle load estimate is inhibited for once the inhibiting condition is no longer satisfied. For example, the first vehicle load estimate continues to be inhibited for a short time after the brake pedal is released. The respective period that is applied to each condition is calibrated to the specific application.

Regarding the second vehicle load estimate, although the estimated road gradient based on accelerometer measurements is relatively reliable for most operating conditions, the algorithm that produces an estimate of the vehicle mass is susceptible to many of the same factors as the road load model. Accordingly, the mass estimation algorithm is inhibited or suspended temporarily when any of the following conditions apply:

- the vehicle brake is pressed, in which case no reliable value for torque is available for the mass estimation model;
- the rate of change of the rear drive shaft torque (for example the torque following the final drive in transverse transmission arrangements) exceeds a threshold, noting that generally stable torque is required for an accurate estimation of mass;
- the rate of change of the road gradient (as indicated by the accelerometer readings) exceeds a threshold, as a relatively stable gradient is required for an accurate mass estimation;
- the torque converter of the transmission 26 is unlocked or open, since no reliable torque value is available for the mass estimation algorithm at such times;
- the torque direction is transitioning from driving torque to overrun torque, for example when the accelerator pedal is released—the lash crossing produces unreliable output torque;
- a gear shift is in progress, during which no reliable value for torque is available for the mass estimation algorithm;
- a vehicle traction control system is active, since such systems interfere with the torque applied to the transmission 26, which is therefore no longer a reliable indication of road load on which to base the mass estimate;
- reverse gear is selected, as the mass estimation model is not calibrated for reversing;
- the vehicle speed is below a threshold, noting that signals indicative of vehicle speed tend to be unreliable at low speeds, and an accurate indication of vehicle speed is required to calculate aero drag on the vehicle 10 since estimating mass entails resolving the forces acting on the vehicle 10;
- the longitudinal acceleration of the vehicle 10 is below a threshold, as the estimation may tend towards infinity as the acceleration, which forms part of the denominator of an equation for calculating mass, tends towards zero, and also measurement error becomes significant and so leads to unreliable results;
- the gear selector position or shift mode is changing or has recently changed, as the system requires a short period to settle after such changes;
- the gearbox oil temperature is below a threshold, as the transmission torque loss may be elevated until the oil reaches its operational temperature, before which the oil viscosity is high and frictional losses increase;
- the lateral acceleration is above a threshold, which typically indicates that the vehicle 10 is cornering, in which case the algorithm cannot account for tyre slip and so the mass estimation is inhibited due to the inaccurate information available, and also in case the vehicle 10 is traversing a relatively flat switchback on a steep alpine road, for example, to prevent the triggering of an upshift during cornering due to the temporary change in road gradient.

If the mass estimation algorithm is inhibited during the period defined for producing an estimate of sufficient accuracy, the period is extended by a corresponding amount. This in turn delays the availability of an accurate second vehicle load estimate.

Conversely, if the mass estimation algorithm is inhibited after the initial period has elapsed, the most recent estimate for the vehicle mass is used to generate the second vehicle load estimate based on the estimated road gradient calculated from the latest accelerometer measurements. In particular, this enables the second vehicle load estimate to be generated at times when the vehicle 10 is stationary, which as already noted is when the road gradient estimate is the most accurate due to low signal noise.

As already noted, before the period defined for producing an accurate mass estimate has expired, a calibrated value for the base vehicle mass is instead used as the mass estimate. This enables the second vehicle load estimate to be produced with reasonable accuracy before a more accurate mass estimate becomes available, so that the second vehicle load estimate is available at all times. One possible exception to this is when signal failures prevent a reliable estimation of the road gradient from being derived from the accelerometer readings, in which case the second vehicle load estimate may be inhibited.

Figure 3:
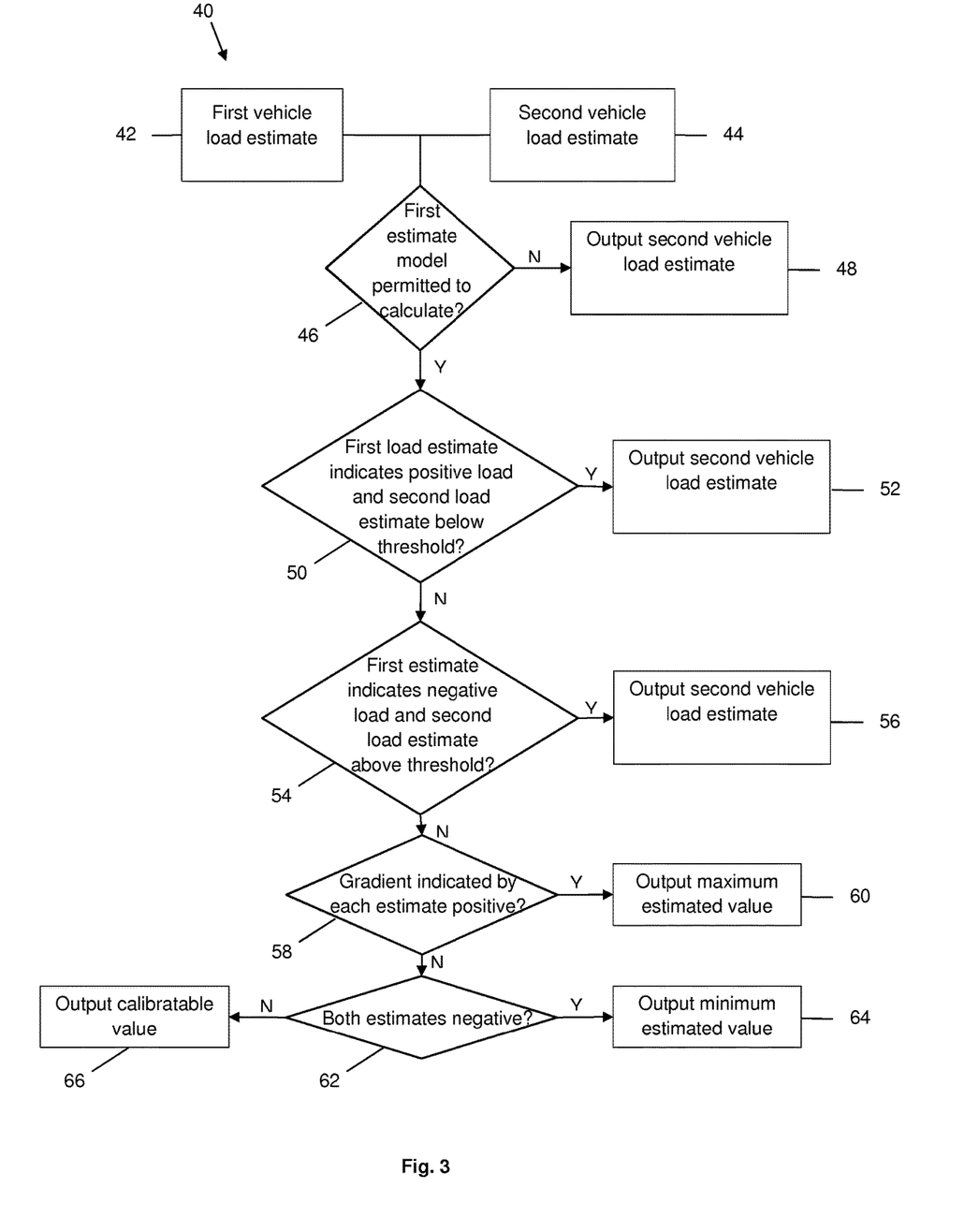
FIG. 3 is a flow diagram representing a process according to an embodiment of the invention for arbitrating between two or more vehicle load estimates.

FIG. 3 shows an arbitration process 40 undertaken by the PCM 34 to arbitrate between the first and second vehicle load estimates to select a final vehicle load estimate, which is used for controlling other vehicle systems such as the automatic transmission 26.

The arbitration process 40 begins with the first and second vehicle load estimates being produced at steps 42 an 44 using, respectively, the road load model, and the estimated road gradient derived from accelerometer readings in combination with the mass estimation algorithm.

If any of the inhibit conditions apply for the first vehicle load estimate, so that the road load model is not permitted to calculate at step 46 an estimated vehicle load, the process 40 simply outputs the second vehicle load estimate at step 48 as the final vehicle load estimate. In this respect, it is again noted that the second vehicle load estimate is generally available at all times, since it can be calculated from a calibrated value for the base mass until an accurate mass estimate becomes available.

As noted above, the exception to this is when there is a signal error that prevents the actual road gradient being estimated accurately, in which case a calibrated value for the vehicle load is output if the road load model is also inhibited. This allows the PCM 34 to output a safe and known vehicle load value that will not cause, for example, inappropriate gear shifting that may be noticed by a driver, even if that results in non-optimal performance. For example, it may be preferable to assume a vehicle load corresponding to a road gradient of zero and no headwind in the absence of data to the contrary, since a driver is unlikely to notice early upshifts on an incline, but may notice late upshifts on a flat road as would result if a higher gradient were assumed.

If the road load model is permitted to calculate the first vehicle load estimate, characteristics of the first and second vehicle load estimates are then checked to determine which should be selected as the final vehicle load estimate.

The first step of these checks is to assess at step 50 whether the first vehicle load estimate is positive and the second load estimate based on the accelerometer readings is below a first calibrated threshold that may be, for example, a low positive number corresponding to an effective gradient of around 2%. If so, the arbitration process 40 outputs the second vehicle load estimate at step 52 as the final vehicle load estimate.

This is based on the reasoning that, in this condition, it is likely that the road load model has produced an unreliable result, for example because it has recently been inhibited and so is filtering towards a new estimated value. In these circumstances, the second vehicle load estimate is more likely to reflect the actual vehicle load accurately. In other words, if the road load model gives an estimate of vehicle load that suggests that the road 12 has a positive gradient when the accelerometer readings indicate that the road 12 is near horizontal, the road load model is assumed to have produced an unreliable result.

If not, the arbitration process 40 then checks at step 54 whether the opposite is true; namely, whether the first vehicle load estimate is negative and the second load estimate based on accelerometer readings is above a second calibrated threshold. The second calibrated threshold may be different to the first calibrated threshold, and may be, for example, a low negative value corresponding to an effective road gradient of around 2%.

If so, the arbitration process 40 outputs the second vehicle load estimate at step 56 as the final vehicle load estimate, for the same reasons as for the situation above where the road load model indicates a vehicle load that suggests a higher positive gradient than the gradient estimate based on the accelerometer readings.

If neither of the above sets of conditions is true, the arbitration process 40 then determines at step 58 whether the effective road gradient indicated by the first vehicle load estimate and the actual gradient estimate based on the accelerometer readings are both positive, in which case the larger of the first and second vehicle load estimates is selected at step 60 as the final vehicle load estimate. This ensures that the vehicle 10 is controlled for the worst case scenario when both vehicle load estimates appear valid and indicate a positive effective road gradient.

For example, if the vehicle 10 is towing a trailer, the overall mass is significantly higher than the calibrated mass value that is used as the mass estimate until the period for the mass estimation algorithm to produce an accurate mass estimate has elapsed. In turn, the second vehicle load estimate will also be too low until the accurate mass estimate becomes available. In this scenario, the first vehicle load estimate, which measures vehicle load in a more direct manner and is not impacted by the inaccuracy of the mass estimate, is likely to be higher and should therefore be selected as the final vehicle load estimate.

If the effective road gradient estimate and the actual road gradient estimate associated with the first and second vehicle load estimates respectively are not both positive, the PCM 34 then checks at step 62 whether they are instead both negative, and if so selects the smaller of the two vehicle load estimates at step 64 as the final vehicle load estimate. The reason for selecting the minimum value when both vehicle load estimates indicate negative road gradients is the same as for selecting the maximum value when both vehicle load estimates indicate positive road gradients.

If none of the above conditions are satisfied, it can be assumed that there has been a fault in determining at least one of the first and second vehicle load estimates, in which case the calibrated value referred to earlier is used as the final vehicle load estimate at step 66, to ensure that the vehicle load value that is used will provide safe and predictable behaviour.

In addition to the conditions shown in FIG. 3, the process 40 may be enhanced by adding the ability to inhibit either the first or the second vehicle load estimate in the event that either of them are compromised due to poor signal quality with respect to the data that the respective estimation algorithms depend on. As above, if both estimates are inhibited, the calibrated value is used as the final vehicle load estimate.

As described above, once the PCM 34 has selected one of the vehicle load estimates at step 64 or 66 of the arbitration process 40, this estimate is used to select an appropriate shift map and determine a set of shift points for the automatic transmission 26. If the first vehicle load estimate is selected, the effective road gradient determined from this vehicle load estimate, as used at step 58 of the arbitration process 40, is used to select an appropriate shift map and determine the set of shift points. If the second vehicle load estimate is selected at step 64 or 66, an effective road gradient is subsequently determined from this vehicle load estimate. This effective road gradient is then used to select an appropriate shift map and to determine the set of shift points.

Figure 4:
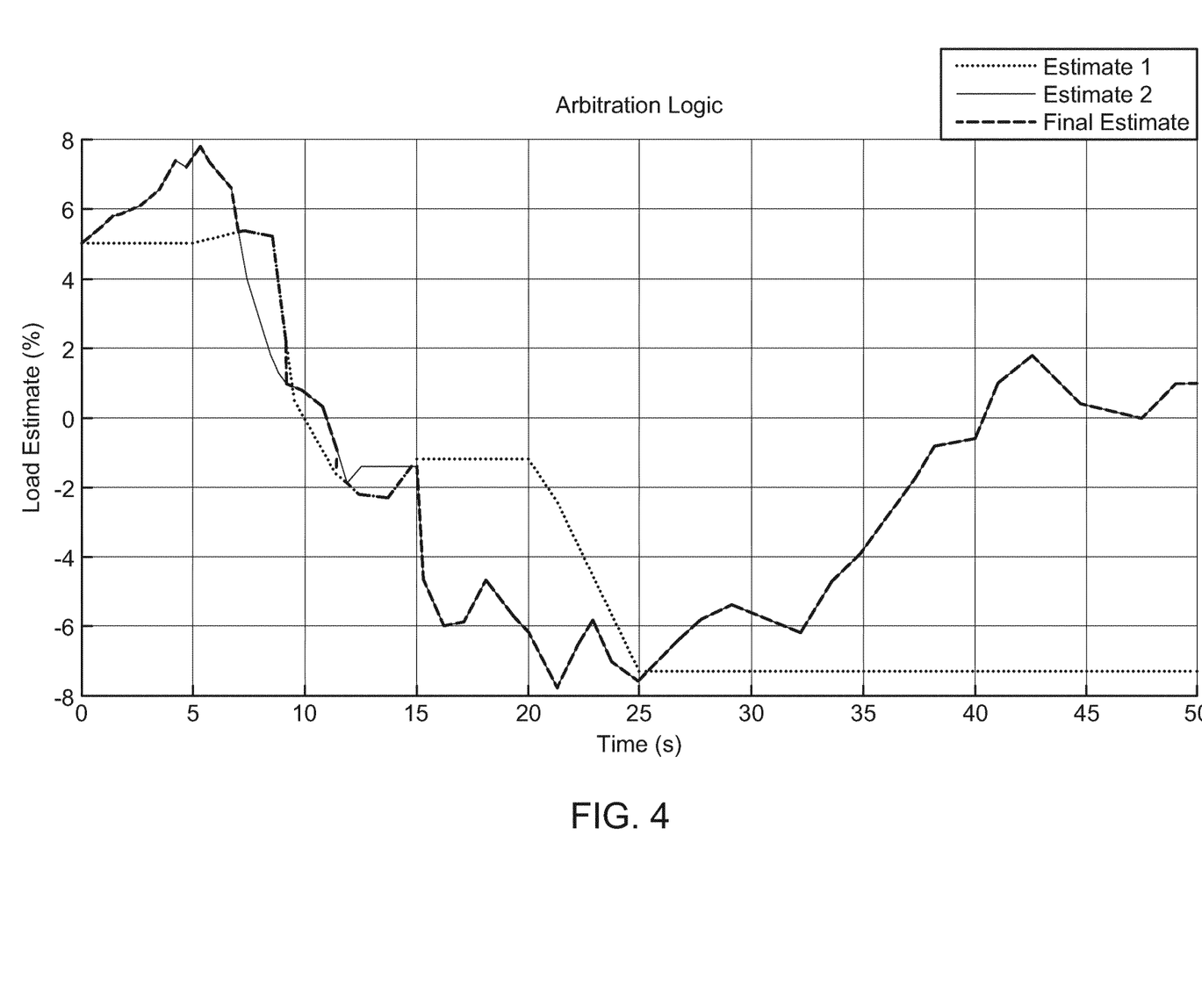
FIG. 4 is a graph showing a set of vehicle load estimates for a simulated journey for the vehicle of FIG. 1.

FIG. 4 is a graph plotting examples of first and second vehicle load estimates as calculated by a model using simulated data, to show how the PCM 34 applies the logic set out in FIG. 3 to arbitrate between the two to select a final load estimate.

In the graph key, 'estimate 1' corresponds to the first vehicle load estimate, which is based on the road load model, whereas 'estimate 2' corresponds to the second vehicle load estimate, which is based on the accelerometer measurements. It is noted that the load estimates are normalised as effective road gradients based on the base mass of the vehicle 10, and so are expressed as percentages.

In an initial period spanning from 0 seconds to 12 seconds, the PCM 34 selects the higher of the two load vehicle load estimates, as both are positive and above the relevant thresholds. An exception to this occurs at around 9 seconds, where the PCM 34 briefly selects the lower vehicle load estimate as the final estimate due to breach of a threshold.

Beyond this, the PCM 34 selects the minimum vehicle load estimate as the final load estimate until around 25 seconds into the simulation, since both estimates are negative at that stage. From 25 seconds onwards, the first vehicle load estimate is inhibited, and so the second vehicle load estimate is taken forward as the final load estimate.

Many modifications may be made to the above examples without departing from the scope of the present invention as defined in the accompanying claims.

The invention claimed is:

1. A method of estimating a load on a vehicle, the method comprising:
    obtaining a first load estimate using a first load estimation technique;
    obtaining a second load estimate using a second load estimation technique;
    analyzing characteristics of the first load estimate and the second load estimate;
    based on the analysis selecting either the first load estimate or the second load estimate as an output load estimate;
    outputting the output load estimate; and
    receiving at least one signal indicative of vehicle operating parameters and inhibiting the first load estimation technique and/or the second load estimation technique in dependence on the at least one signal indicative of the vehicle operating parameters.

2. The method of claim 1, comprising determining an estimated gradient of a surface on which the vehicle is located associated with each of the first and second load estimates, respectively, and wherein analyzing characteristics of the first load estimate and the second load estimate comprises analyzing corresponding characteristics of the estimated gradients associated with the first and second load estimates, respectively.

3. The method of claim 2, wherein analyzing characteristics of the first load estimate and the second load estimate comprises comparing the estimated gradient associated with the second load estimate with at least one threshold value.

4. The method of claim 3, comprising selecting the second load estimate as the output load estimate if the estimated gradient associated with the second load estimate is below a first threshold value and the estimated gradient associated with the first load estimate is positive.

5. The method of claim 4, wherein the first threshold is positive.

6. The method of claim 4, comprising selecting whichever of the first load estimate and the second load estimate has a highest value as the output load estimate if the estimated gradients associated with the first and second load estimates are both positive and the estimated gradient associated with the second load estimate exceeds the first threshold.

7. The method of claim 3, comprising selecting the second load estimate as the output load estimate if the estimated gradient associated with the second load estimate is above a second threshold value and the estimated gradient associated with the first load estimate is negative.

8. The method of claim 7, wherein the second threshold value is negative.

9. The method of claim 8, comprising selecting whichever of the first load estimate and the second load estimate has a lowest value as the output load estimate if the estimated gradients associated with the first and second load estimates are both negative and the estimated gradient associated with the second load estimate is below the second threshold.

10. The method of claim 1, comprising inhibiting the first load estimation technique and/or the second estimation technique in dependence on the quality of the at least one signal indicative of the vehicle operating parameters.

11. The method of claim 1, wherein the vehicle operating parameters comprise at least one of: a braking state; a transmission state; a gear selector state; lateral acceleration of the vehicle; operating mode; vehicle speed; longitudinal acceleration; gearbox oil temperature; a traction control system state; a rate of change of drive shaft torque; a rate of change of a gradient of a surface on which the vehicle is traveling; a torque converter state; and a torque direction.

12. The method of claim 1, wherein the first load estimation technique comprises receiving a signal indicative of an acceleration of the vehicle, and comparing the indicated acceleration with a predicted acceleration to determine the first load estimate.

13. The method of claim 1, wherein the second load estimation technique comprises receiving a signal indicative of a longitudinal acceleration of the vehicle and resolving a component of the longitudinal acceleration that is due to gravity.

14. The method of claim 13, comprising estimating a gradient of a surface on which the vehicle is located in dependence on the magnitude of the component of the longitudinal acceleration that is due to gravity.

15. The method of claim 14, comprising estimating a mass of the vehicle and determining the second load estimate in dependence on the estimated mass and the estimated gradient.

16. A method of operating a vehicle, comprising estimating the load on the vehicle using the method of claim 1, and controlling an automatic transmission of the vehicle in dependence on the output load estimate.

17. A non-transitory computer readable medium comprising computer readable code for controlling a computing device to perform the method according to claim 1.

18. A controller configured to control a vehicle automatic transmission, the controller comprising a processor configured to:
 obtain a first load estimate using a first load estimation technique;
 obtain a second load estimate using a second load estimation technique;
 analyze characteristics of the first load estimate and the second load estimate;
 based on the analyzed characteristics, select either the first load estimate or the second load estimate as an output load estimate; and
 output the output load estimate,
 wherein the processor is further configured to receive at least one signal indicative of vehicle operating parameters and inhibit the first load estimation technique and/or the second estimation technique in dependence on the at least one signal.

19. A vehicle comprising the controller of claim 18.

* * * * *